United States Patent
Kimbrough et al.

(10) Patent No.: US 6,231,058 B1
(45) Date of Patent: May 15, 2001

(54) ADJUSTABLE CONTAINER CADDY

(75) Inventors: Laurel M. Kimbrough, Atlanta, GA (US); Jay K. Fording, Matthews, NC (US); Keith G. Savas; Benjamin J. Nash, both of Charlotte, NC (US); Edgar B. Montague, III, Fort Mill, SC (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/360,031

(22) Filed: Jul. 23, 1999

(51) Int. Cl.$^7$ ...................................................... B60N 3/10
(52) U.S. Cl. ...................................... 280/33.992; 224/411
(58) Field of Search ........................ 280/33.992, 33.993; 224/926, 274, 409, 411; D7/619, 620; D34/27; 248/311.2

(56) References Cited

U.S. PATENT DOCUMENTS

| | | | |
|---|---|---|---|
| D. 307,669 | 5/1990 | Inouye | D7/620 |
| D. 368,628 | 4/1996 | Bergin | D7/620 |
| D. 383,284 | 9/1997 | Lines | D34/27 |
| D. 383,362 | 9/1997 | Ayotte et al. | D7/620 |
| D. 398,127 | 9/1998 | Bergin et al. | D34/27 |
| D. 400,678 | 11/1998 | Clark et al. | D34/27 |
| 1,127,793 | 2/1915 | Mettler | 248/154 |
| 2,633,278 | 3/1953 | Muniz | 224/42.46 |
| 2,763,413 | 9/1956 | Felton | 224/42.46 |
| 3,297,289 | 1/1967 | La Raus | 248/152 |
| 3,734,439 | 5/1973 | Wintz | 248/224 |
| 3,938,869 | 2/1976 | Josey | 312/100 |
| 4,088,250 | 5/1978 | Schaefer | 224/5 W |
| 4,446,508 | 5/1984 | Kinzie | 362/31 |
| 4,693,440 | 9/1987 | Lalonde | 248/154 |
| 4,726,468 | 2/1988 | Hesser et al. | 206/423 |
| 4,767,089 | 8/1988 | Self | 248/152 |
| 4,819,803 | 4/1989 | Neiser | 206/423 |
| 4,844,399 | 7/1989 | Harm | 248/311.2 |
| 4,887,784 | * 12/1989 | Kayali | 248/311.2 |
| 4,889,267 | 12/1989 | Bolton | 224/274 |
| 5,012,966 | * 5/1991 | Turner et al. | 280/33.992 |
| 5,024,411 | 6/1991 | Elwell | 248/311.2 |
| 5,028,023 | 7/1991 | Allen | 248/152 |
| 5,044,577 | 9/1991 | Spearman | 224/42.45 |
| 5,060,798 | 10/1991 | Braastad | 206/423 |
| 5,104,186 | 4/1992 | Kwasnik et al. | 297/194 |
| 5,106,046 | * 4/1992 | Rowles et al. | 248/311.2 |
| 5,131,716 | 7/1992 | Kwasnik et al. | 297/194 |
| 5,190,257 | 3/1993 | Gradei et al. | 248/231.7 |
| 5,195,706 | 3/1993 | Allen | 248/152 |
| 5,320,406 | * 6/1994 | North | 248/311.2 |
| 5,362,077 | 11/1994 | Adamson | 280/33.992 |
| 5,400,990 | 3/1995 | Frankel | 248/215 |
| 5,421,638 | 6/1995 | Ayotte et al. | 297/188.04 |
| 5,433,361 | 7/1995 | O'Malley | 224/274 |
| 5,464,183 | 11/1995 | McConnell et al. | 248/311.2 |
| 5,484,129 | 1/1996 | Megal | 248/311.2 |
| 5,494,306 | 2/1996 | Adamson et al. | 280/33.992 |
| 5,503,297 | 4/1996 | Frankel | 220/751 |

(List continued on next page.)

FOREIGN PATENT DOCUMENTS

2 254 793   10/1992   (GB) .

Primary Examiner—J. J. Swann
Assistant Examiner—Christopher Bottorff
(74) Attorney, Agent, or Firm—Sutherland Asbill & Brennan, LLP (57) ABSTRACT

A container caddy for use with a shopping cart. The container caddy includes a container receptacle and an attachment bracket. The attachment bracket includes a positioning element and a locking element. The attachment bracket can be positioned on the shopping cart and the container receptacle can be maneuvered by the positioning element until locked into place by the locking element.

28 Claims, 12 Drawing Sheets

U.S. PATENT DOCUMENTS

| | | | |
|---|---|---|---|
| 5,531,238 | 7/1996 | Azzarelli et al. | 135/66 |
| 5,579,968 | 12/1996 | Staschiak | 224/274 |
| 5,664,718 | 9/1997 | Vine | 224/545 |
| 5,671,877 | 9/1997 | Yabuya | 224/282 |
| 5,673,835 | 10/1997 | Kalat | 224/556 |
| 5,678,741 | 10/1997 | Schieber | 224/275 |
| 5,695,162 | 12/1997 | DiCastro | 248/231.81 |
| 5,709,429 | 1/1998 | Bergin | 297/188.04 |
| 5,746,363 | 5/1998 | Teller et al. | 224/547 |
| 5,803,327 | 9/1998 | Nipper et al. | 224/407 |
| 5,938,091 | 8/1999 | Bergin et al. | 224/411 |

\* cited by examiner

ADJUSTABLE CONTAINER CADDY

TECHNICAL FIELD

The present invention relates to a mounted beverage container receptacle and more particularly relates to a receptacle for bottles, cans, or cups having a positioning element so as to be mounted on any type of conventional shopping cart or other structure.

BACKGROUND OF THE INVENTION

As is well known in the art, a conventional shopping cart generally includes a large basket, an undercarriage with a number of wheels, a push handle, and a child seat. The shopping carts generally nest together so as to minimize storage space and to permit a number of shopping carts to be moved together. Various types of add-on devices have been used with conventional types of shopping carts. These add-on devices include various types of advertisements, child safety seats, and even computer touch screens. Another known type of add-on device is a beverage receptacle. These beverage receptacles allow a shopper to place a bottle, can, or cup within the receptacle while shopping. For example, a known receptacle is shown in commonly-owned U.S. Pat. No. 2,763,413, entitled "Bottle Holder for Grocery Carts." This patent is incorporated herein by reference. This reference shows a device with a number of steel rods forming a bottle receptacle and having a hook-like element that may be crimped to a structural member of a grocery cart.

The problem with such known beverage receptacles are several fold. First, the positioning of the beverage receptacle on the shopping cart may prevent the shopping carts from nesting properly. For example, if the beverage receptacle is mounted on the sides, on either end, on the push handle, or on certain interior locations of the shopping cart, the shopping carts may not be able to nest together completely. This means that the carts cannot be stored properly or maneuvered as a group. Such a result is clearly disfavored by the supermarket operator. Another problem with known beverage receptacles is the lack of compatibility with various types of conventional shopping carts. Shopping carts typically come in various shapes and sizes with various elements having different angles and configurations. A bottle receptacle that is adequate in one model of shopping cart very well may not be adaptable to another model.

What is needed, therefore, is a receptacle for bottles, cans, and cups that can be used with a conventional shopping cart. The receptacle must adequately support a beverage container while also allowing multiple shopping carts to nest properly. Further, the beverage receptacle should be adaptable to various types and models of shopping carts. These goals should be accomplished with a beverage receptacle that is relatively practical, inexpensive, and easy to clean.

SUMMARY OF THE INVENTION

The present invention thus provides a container caddy for use with a shopping cart. The container caddy includes a container receptacle and an attachment bracket. The attachment bracket includes a positioning element and a locking element. The attachment bracket can be positioned on the shopping cart and the container receptacle can be maneuvered by the positioning element until locked into place by the locking element.

Specific embodiments of the present invention include the use of a thermoplastic material for the container caddy. The positioning element may include a hinge, specifically, a living hinge. The container receptacle may have a base and a recess. The base may have a substantially circular-shaped portion. The base may be a unitary element or the base may have a first surface, a second surface, and a number of support elements connecting the first surface and the second surface. The base may have one or more drain openings. The base may have advertising indicia thereon. The base also may have an attachment means positioned therein, such as a number of attachment recesses for coordination with the locking element.

The hinge may have a number of attachment arms connected thereto. The attachment arms may have a distance therebetween so as to accommodate attachment to the shopping cart. The attachment arms may have attachment holes therein such that the attachment arms may be secured to the shopping cart. The attachment arms each may have a support wing extending therefrom. The support wings may have a number of positioning means, such as a number of positioning recesses. The positioning recesses of attachment arms may align with the attachment recesses of the base. The recesses are then connected by a connector so as to lock the container receptacle into place. The hinge may have a range of motion of about zero (0) degrees to about twenty-five (25) degrees or more. The attachment bracket also may have advertising indicia thereon.

The container caddy may have a depth dimension extending within the recess and a length dimension extending perpendicular to the recess. The depth dimension may be about two and a half (2.5) inches to about eight (8) inches and the length dimension may be about four (4) inches to less than about eleven (11) inches.

A further embodiment of the present invention provides for a shopping cart. The shopping cart includes a child seat with a back support element connected to an inclined seat support element. The shopping cart also includes a container caddy positioned on the back support element. The container caddy includes a container receptacle and an attachment bracket. The attachment bracket may have a positioning element and a locking element. The attachment bracket can be positioned on the back support element and the container receptacle can be maneuvered by the positioning element about the back support element until the container receptacle is substantially horizontal. The container receptacle is then locked into place by the locking element. A beverage container then can be positioned within the container caddy.

The positioning element may be a living hinge. The inclined seat support element may have an angle from the vertical of about zero (0) degrees to about twenty-five (25) degrees. The living hinge also may have a range of motion of about zero (0) degrees to about twenty-five (25) degrees or more.

A number of the shopping carts can nest together fully, with each of the shopping carts having the container caddy positioned thereon. The shopping carts can nest together without the container caddys positioned thereon interlocking with each other or with the shopping carts. Any number of container caddys can be used on the shopping cart.

The method of the present invention provides for supplying a container caddy for a shopping cart. The container caddy has a container receptacle and an attachment bracket. The shopping cart has a back support element attached to an inclined seat support element. The method includes the steps of attaching the attachment bracket of the container caddy to the back support element of the shopping cart, maneuvering the container receptacle by the attachment bracket about the back support element and the inclined seat support element until the container receptacle is substantially horizontal, and locking the container receptacle in the substantially horizontal position. The method may further include the step of fixedly attaching the attachment bracket to the back support element of the shopping cart and the step of inserting a beverage container within the container receptacle.

Other objects, features, and advantages of the present invention will become apparent upon review of the following detailed description of the preferred embodiments of the invention, when taken in conjunction with the drawings and the appended claims.

DETAILED DESCRIPTION OF THE INVENTION

Referring now to the drawings, in which like numerals refer to like parts throughout the several views, FIGS. 1–8 show a container caddy 100 of the present invention. The container caddy 100 is preferably a unitary element manufactured by injection molding. The container caddy 100 is preferably made from a substantially rigid thermoplastic. Preferred thermoplastic materials include polypropylene, ABS, polycarbonate, or blends thereof. The container caddy 100 also may be fashioned by blow molding, extrusion, or other molding and fashioning methods for thermoplastic materials. Although thermoplastic materials are preferred, almost any type of rigid material may be used. The material is preferably non-corrosive.

The container caddy 100 includes a body 110 having a container portion 120 and an attachment portion 130. The container portion 120 includes a container recess 140 positioned within a base 145. The container recess 140 is preferably sized to accommodate conventionally-sized beverage containers such as twenty (20) ounce bottles, twenty-two (22) ounce cups, or twelve (12) ounce cans. As such, the container recess 140 generally has a diameter of about two and a half (2.5) inches to about eight (8) inches and a depth of about two (2) to about eight (8) inches. Alternatively, the container recess 140 may be sized and shaped to accommodate beverage containers of various dimensions and configurations, such as larger sixty-four (64) ounce bottles, non-circular beverage pouches, smaller cups or containers; or other types of beverage containers.

The base 145 of the container portion 120 is sized to accommodate and support the container recess 140. The base 145 therefore may form one or more walls 150 that surround the container recess 140 with a thickness of about a quarter (0.25) inch to about one (1.0) inch or more depending upon the design. In this embodiment, a single circular wall 150 is used. The base 145, however, can be of almost any shape or size for aesthetic or design purposes. The container caddy 100 as a whole should have a length 5 160 sufficient to support a typical beverage container but no more than about eleven (11) inches. Most conventional shopping carts nest together with a distance between each cart of about eleven (11) inches to more than about fifteen (15) inches. By having a length 160 that is less than the typical minimum nesting distance, the container caddy 100 can be incorporated into almost any conventional type of shopping cart. The length 160 of the container caddy 100 therefore may be about four (4) inches to less than about eleven (1) inches. Alternatives of almost any size or configuration may be used for specifically-sized shopping carts or beverage containers.

The base 145 and the container recess 140 also may have one or more ventilation or drain openings 155 positioned at the bottom of the container recess 140 and extending through the base 145. In this embodiment, the drain openings 155 form a series of arcs surrounding a bottom 157 of the container recess 140. The opening recesses 155, however, may be of any convenient shape or size. The base 145 may have one or more types of advertising indicia 165 thereon. The advertising indicia 165 may be molded into the base 145 or the advertising indicia 165 may be in the form of placards or stickers attached to the base 145 in a conventional manner. In the present embodiment, the advertising indicia 165 may be in the form of the well-known Coca-Cola® contour bottle or other designs molded or attached to the base 145.

The attachment portion 130 generally includes a hinged bracket 170, a support portion 180, and an attachment recess 190. The hinged bracket 170 may include a conventional living hinge 200 and a pair of opposing arms 210. By "living hinge 200", we mean that a crease is formed in the thermoplastic material between the support portion 180 and the pair of opposing arms 210. The living hinge 200 is molded into the container caddy 100. The thermoplastic material of the container caddy 100 bends about this crease or otherwise maneuvered in a conventional fashion. Alternatively, the attachment portion 130 may be provided with other adjustable positioning means in place of the hinged bracket 170 mechanism. Conventional hinges or other conventional types of attachment means may be used between the support portion 180 and the pair of opposing arms 210. For example, various types of conventional telescoping elements also may be used. The support portion 180 may be a continuation of the hinge bracket 170. The support portion 180 and the hinge bracket 170 are generally separated by a score line that is cut or otherwise separated after manufacture.

The opposing arms 210 are spaced apart by a distance sufficient to form a substantially snug fit about a typical shopping cart child seat element. This distance may be about a quarter (0.25) inch to about a half (0.5) inch. Any conventional dimension, however, may be used. For example, the opposing arms 210 may be sized to attach to other types of structures. The opposing arms 210 also have a plurality of attachment openings 220 positioned therein. The attachment openings 220 allow the opposing arms 210 to be fixedly attached to the shopping cart child seat elements by screws, bolts, or by other types of conventional fastening means 230 being inserted therein. Further, the attachment openings 220 may not be needed if the opposing arms 210 attach by a snap fit or similar connection.

Figure 1:
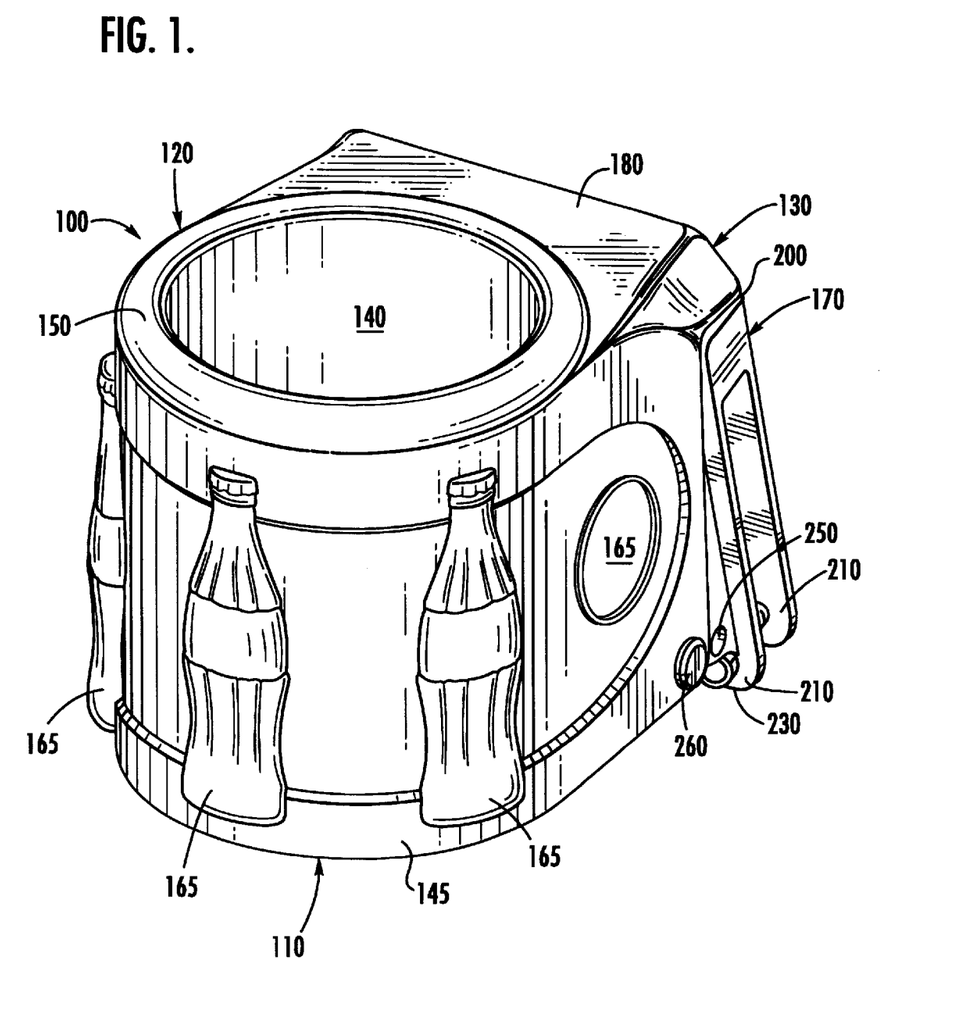
FIG. 1 is a perspective view of the container caddy of the present invention.
Figure 2:
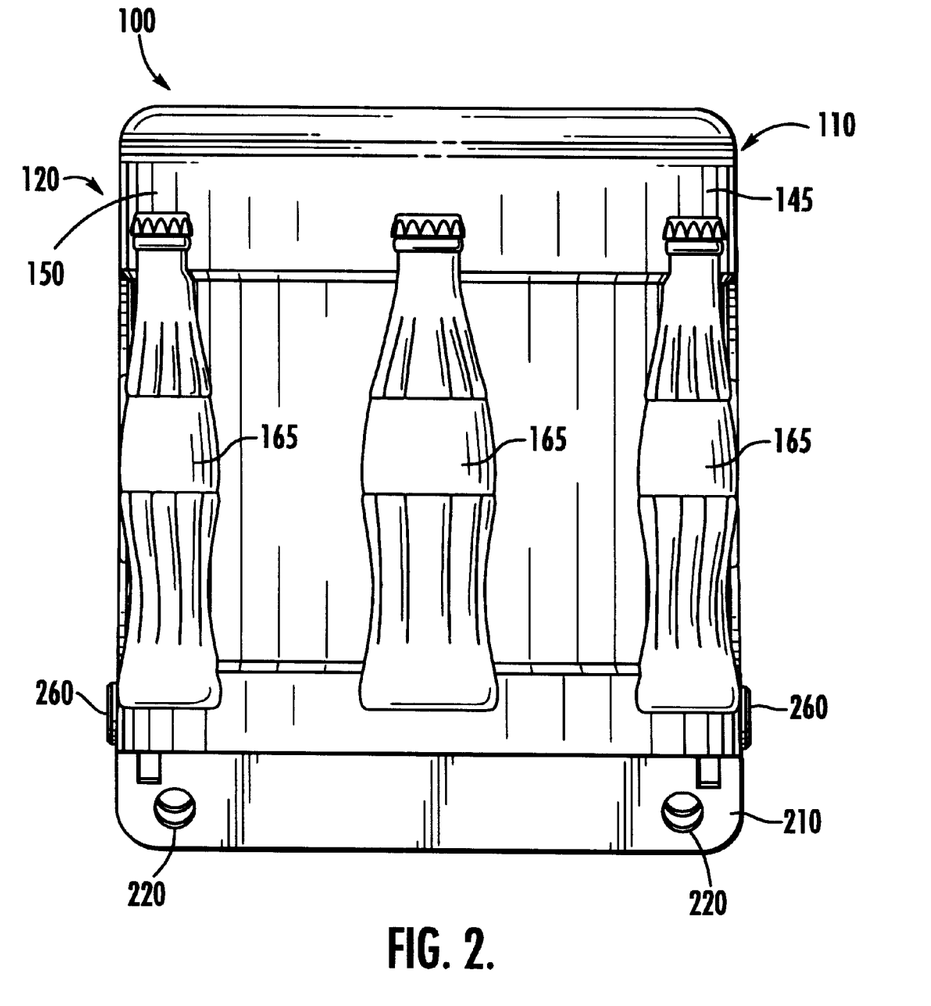
FIG. 2 is a front plan view of the container caddy of the present invention.
Figure 3:
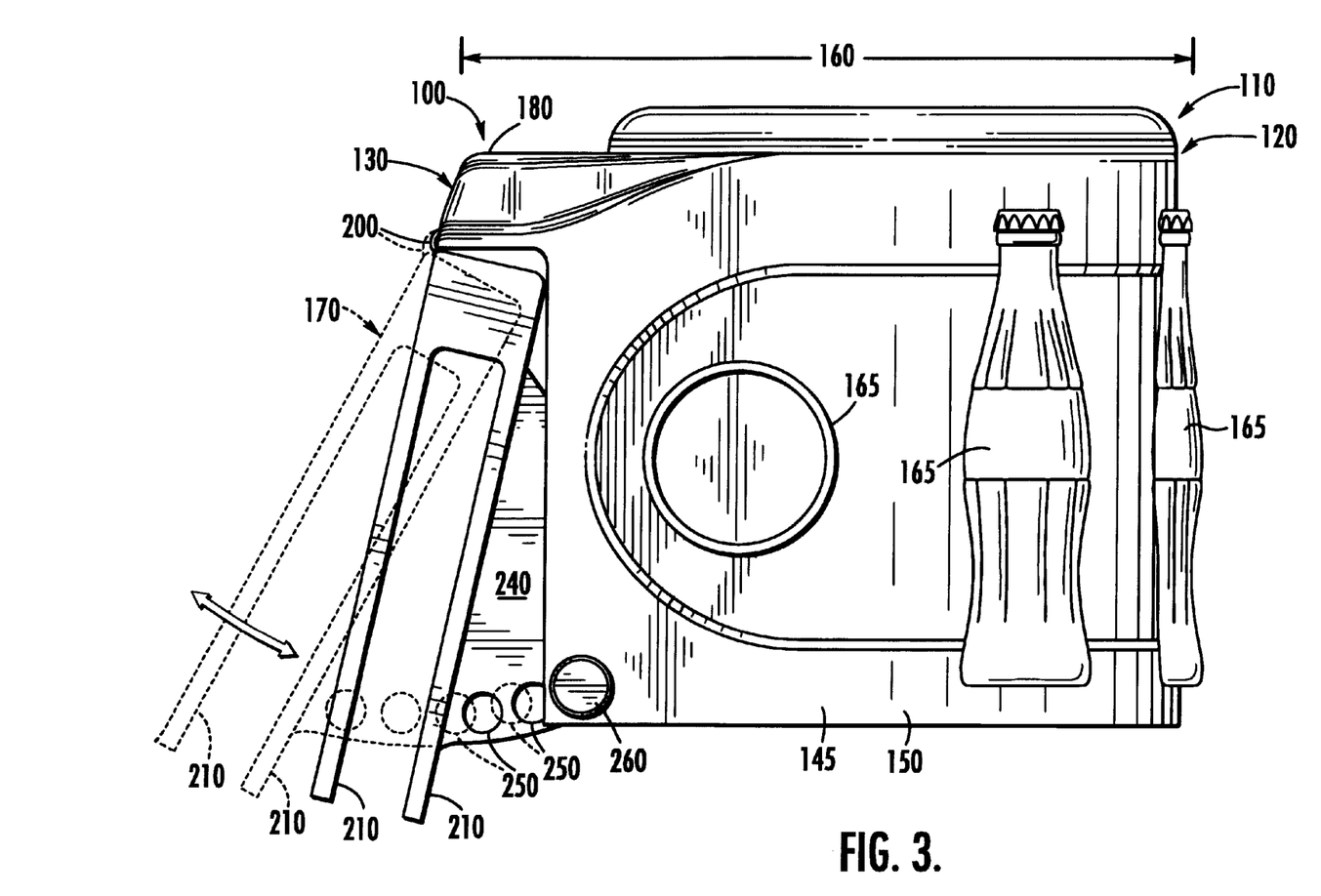
FIG. 3 is a left side plan view of the container caddy of the present invention with the range of motion of the attachment bracket shown.
Figure 4:
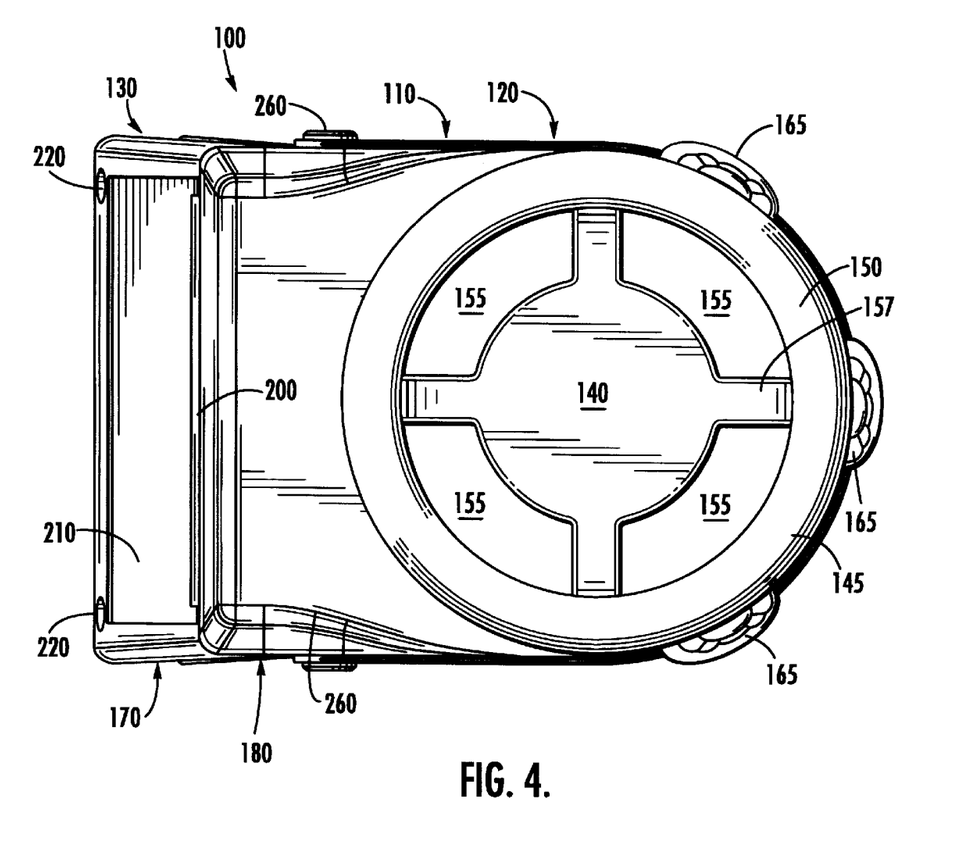
FIG. 4 is a top plan view of the container caddy of the present invention.
Figure 5:
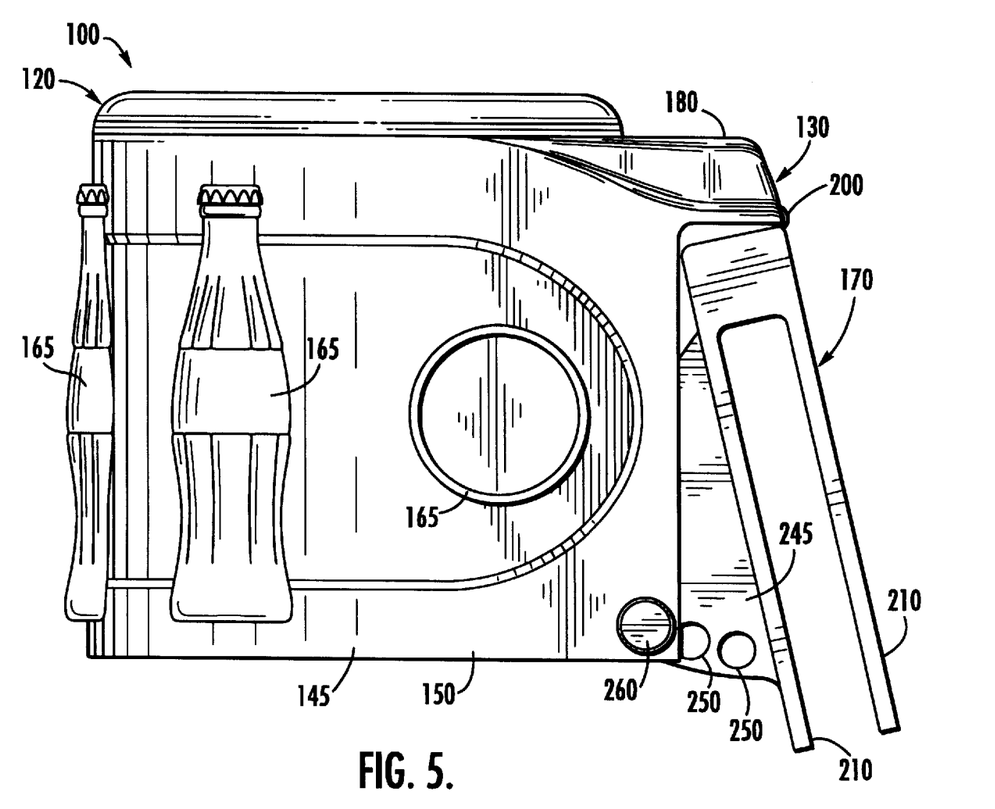
FIG. 5 is a right side plan view of the container caddy of the present invention.
Figure 6:
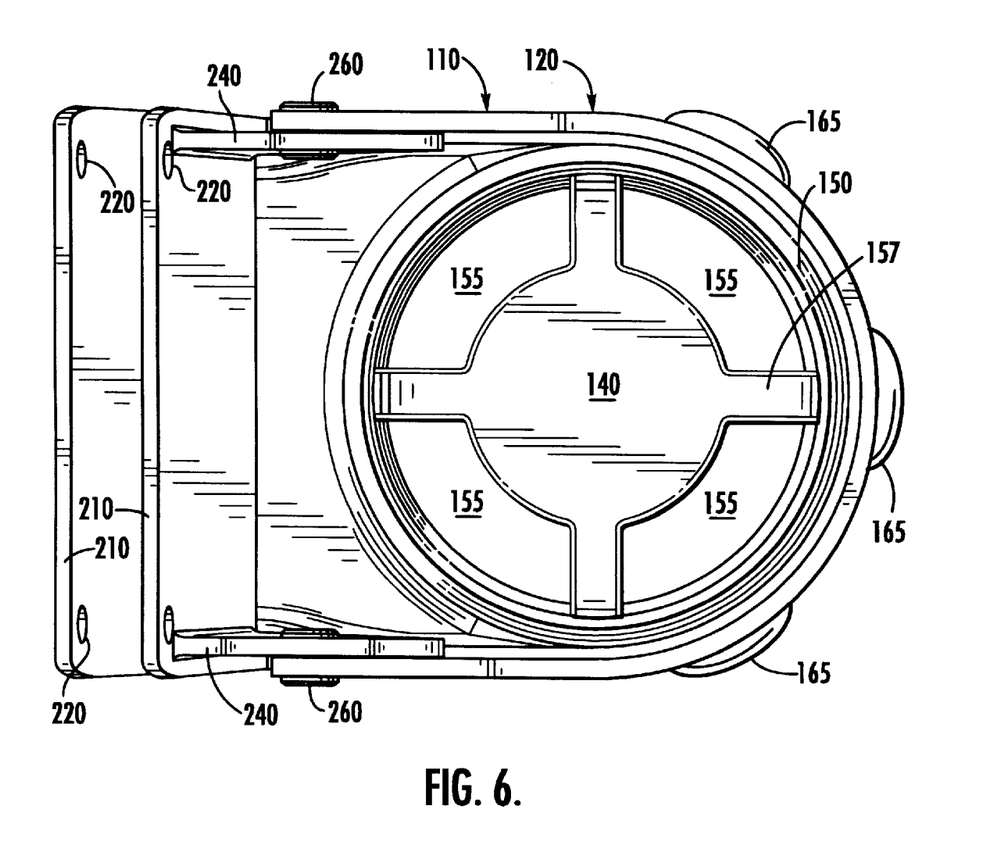
FIG. 6 is a bottom plan view of the container caddy of the present invention.
Figure 7:
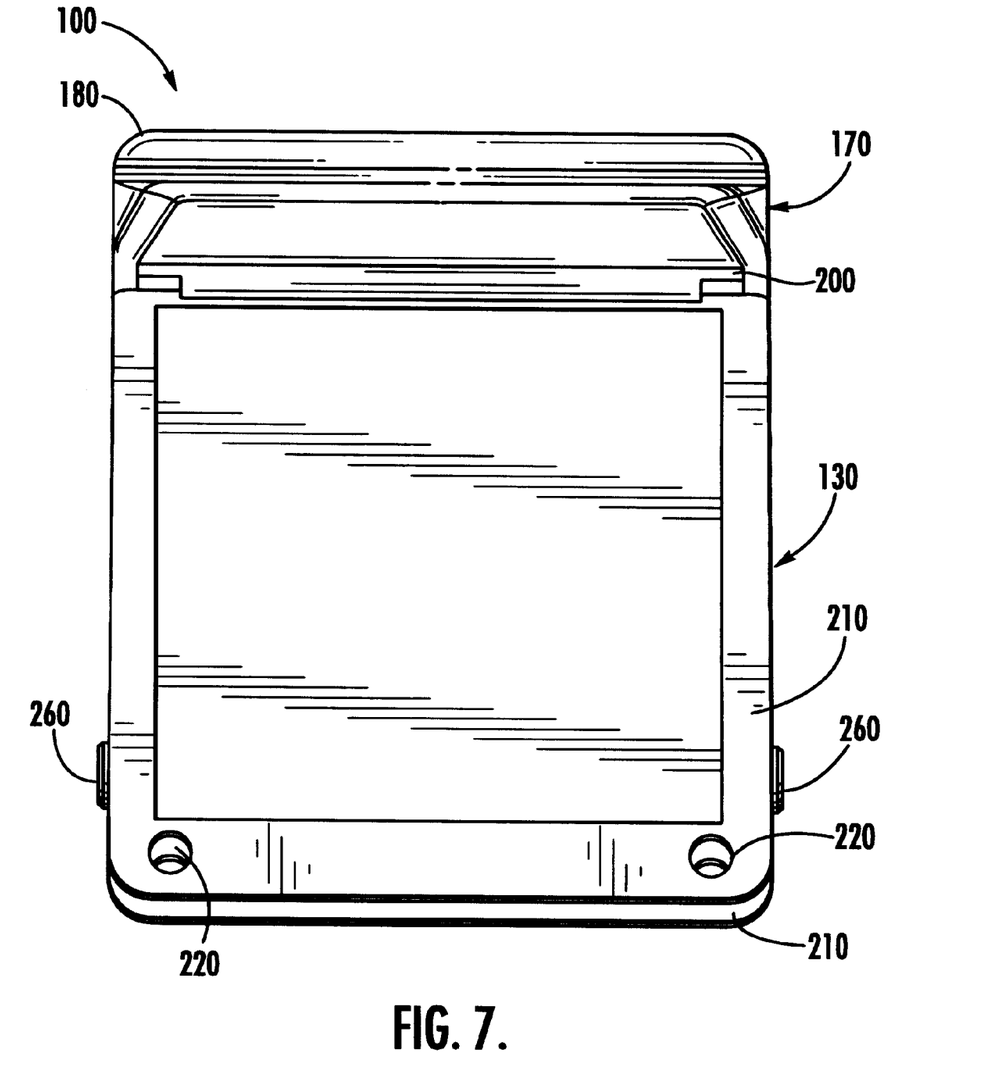
FIG. 7 is a back plan view of the container caddy of the present invention.
Figure 8:
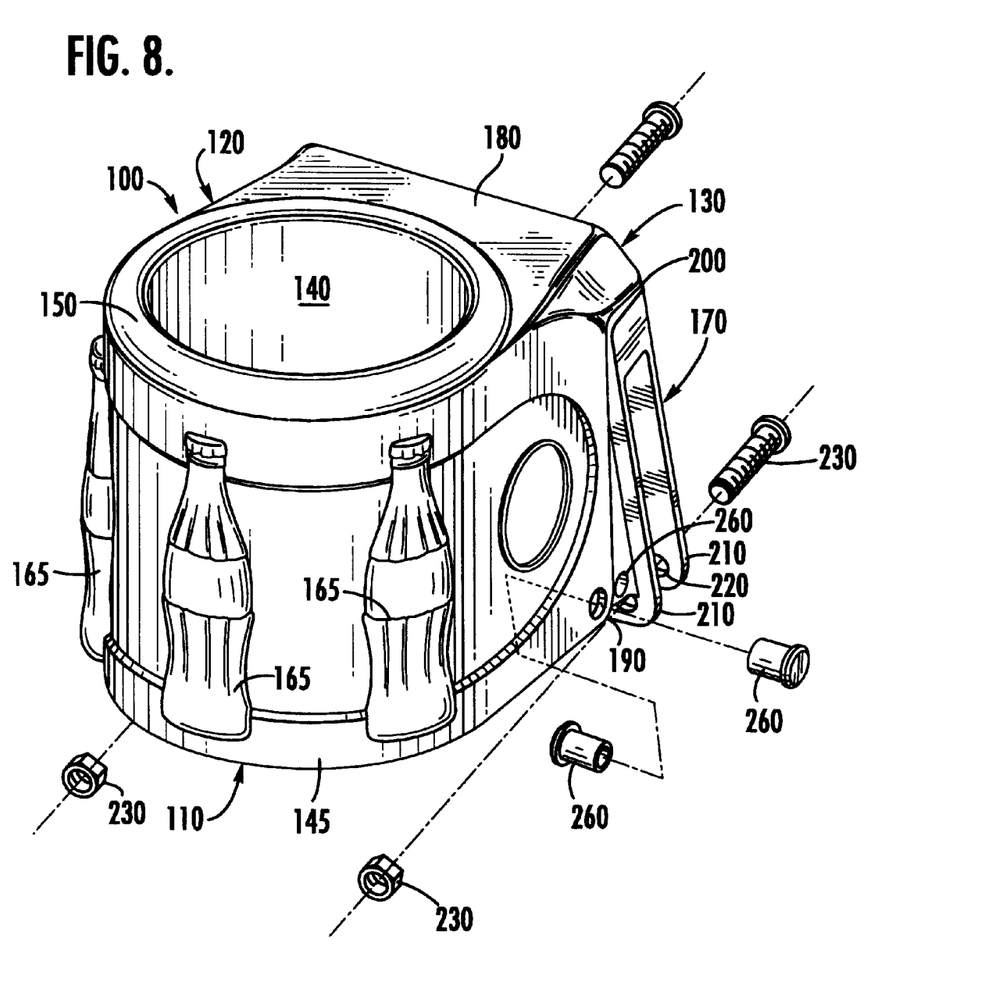
FIG. 8 is an exploded view of the container caddy of the present invention.

The hinge bracket 170 also includes a pair of support wings 240. The support wings 240 extend from the opposing arms 210 towards the attachment recesses 190. The support wings 240 have a plurality of positioning recesses 250 formed therein. The positioning recesses 250 align with the attachment recesses 190. As is shown in FIG. 8, a connector 260 may be inserted into the attachment recess 190 and the positioning recess 250 so as to lock the container portion 120 in place such that the container portion 120 is substantially horizontal. Alternatively, the connector 260 may be formed in the place of the attachment recesses 190 or the positioning recesses 250 for mating with the other. Further, any conventional type of locking means may be used.

The container portion 120 can be oriented in this substantially horizontal position regardless of the angle or the configuration of the child support structures of the shopping cart. By "substantially horizontal", we mean that an open beverage container may be inserted within the container caddy 100 and the beverage container will not spill as the consumer pushes the shopping cart. The various positioning recesses 250 allow the container portion 120 to be supported at an angle anywhere between about zero (0) degrees and about twenty-five (25) degrees or greater. These varying angles allow the container caddy 100 to be adapted to the various angles and configurations used in the child support structures of conventional shopping carts.

Figure 9:
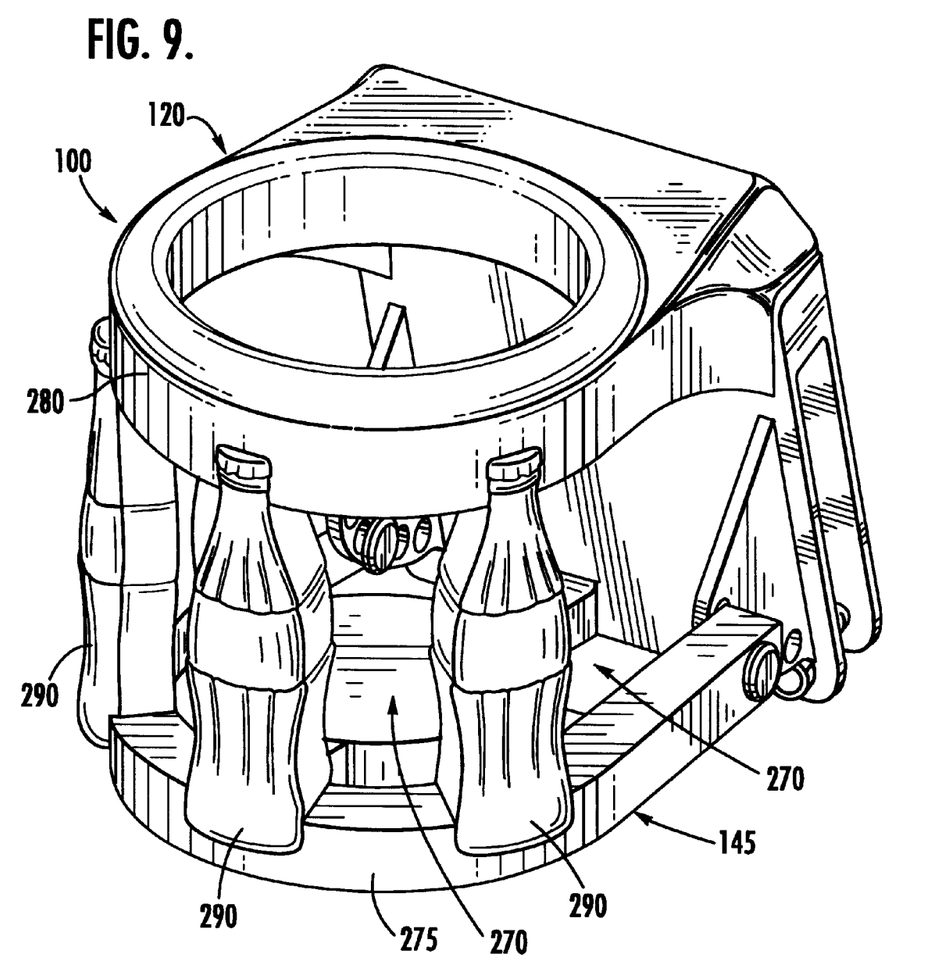
FIG. 9 is an alternative embodiment of the container caddy of the present invention.

The base 145 of the container portion 120 need not be uniform. For example, FIG. 9, shows an alternative embodiment of the present invention, with the base 145 of the container portion 120 having a plurality of gaps 270 positioned therein. The base 145 thus has a first surface 275, a second surface 280, and a plurality of support elements 290 positioned therebetween. In this embodiment, the support elements 290 may be in the form of the well known Coca-Cola® contour bottle or other designs.

Figure 10:
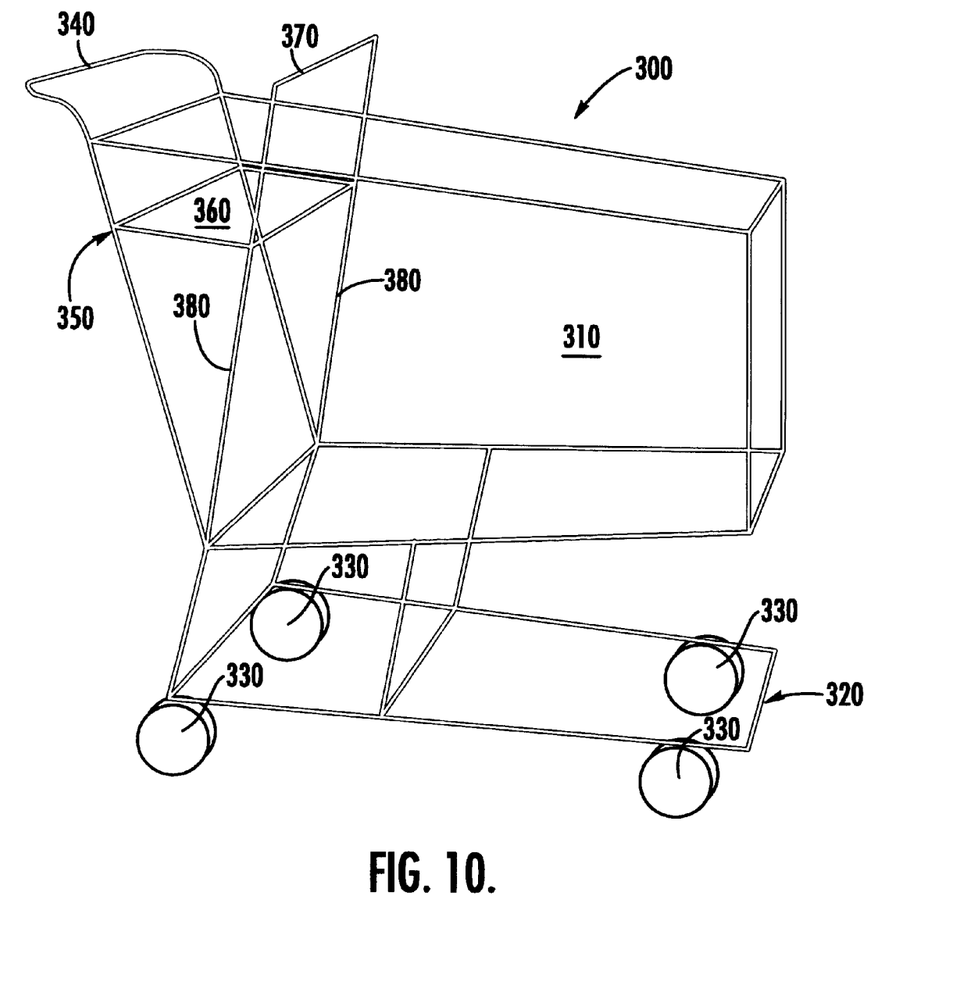
FIG. 10 is a schematic view of a shopping cart.
Figure 11:
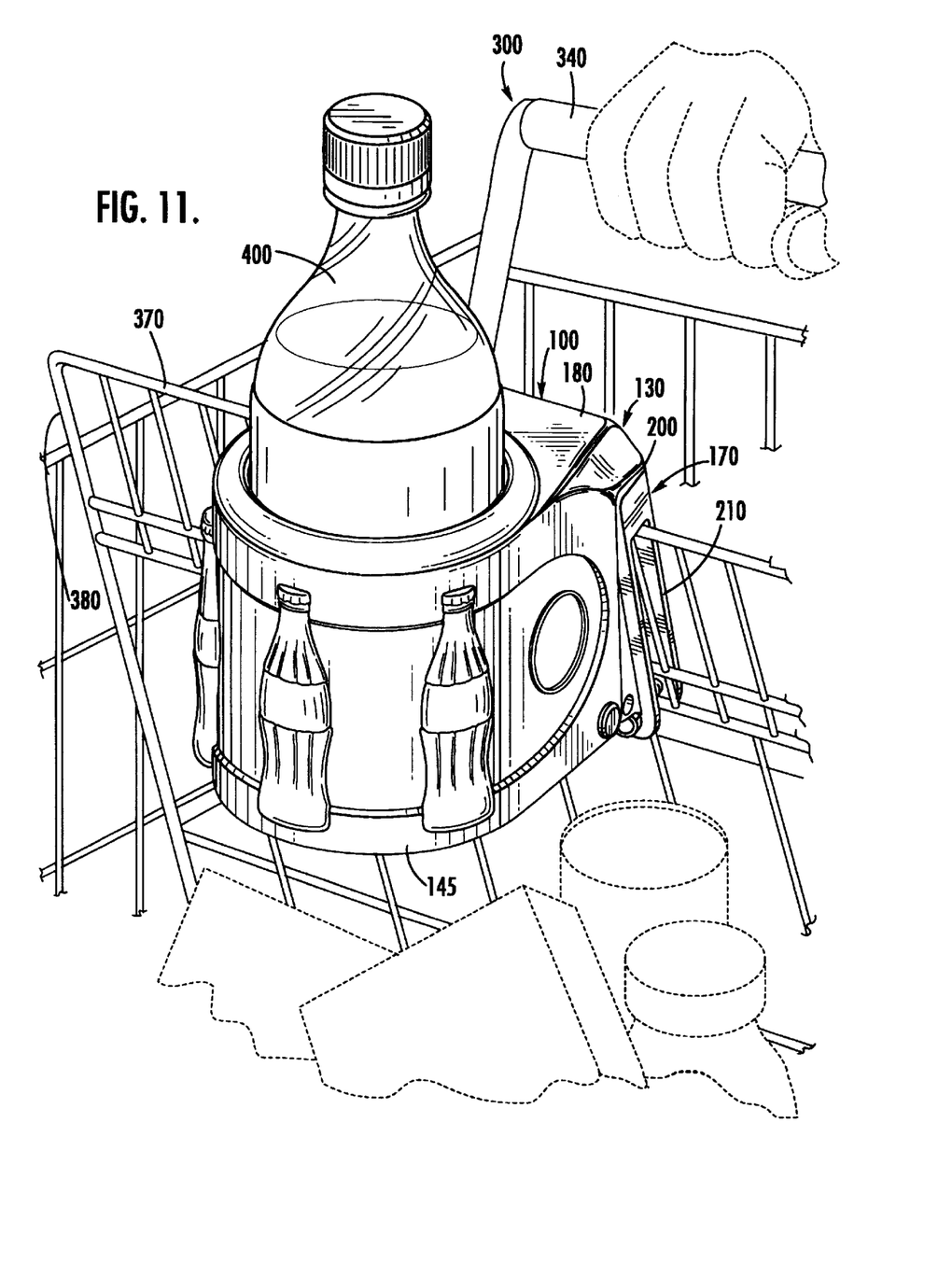
FIG. 11 is a perspective view of the container caddy of the present invention mounted within a shopping cart.

FIG. 10 shows a conventional shopping cart 300 and FIG. 11 shows the container caddy 100 attached to the shopping cart 300. As is shown, the shopping cart 300 generally includes a basket 310 with an undercarriage 320 and a plurality of wheels 330. The shopping cart 300 also includes a push bar 340 and a child seat 350. The child seat 350 includes a seat 360 having a back support element 370 and a pair of inclined seat support elements 380. The child seat 350 is generally collapsible with the inclined seat support element 380 being rotatably attached to the undercarriage 320. When fully extended, the inclined seat support element 380 in most conventional shopping carts may have an angle from the vertical of about zero (0) degrees to about twenty-five (25) with about sixteen (16) degrees being the industry average.

In use, the container caddy 100 is attached to the shopping cart 300 via the attachment portion 130. Specifically, the opposing arms 310 of the hinged bracket 170 are positioned over the back support element 370. The hinged bracket 170 is then secured into place via screws, bolts, or other conventional types of fastening means being inserted through the attachment openings 220. Alternatively, the hinged bracket 170 may attach to the back support element 370 by a snap fit or similar type of connection. The container portion 120 is then rotated about the hinged portion 200 of the attachment portion 130 until the container portion 120 is substantially horizontal. The extent of the rotation depend on the angle from the vertical of the seat support element 380. If the angle from the vertical is about sixteen (16) degrees, then the container portion 120 should be rotated about sixteen (16) degrees. If the angle from the vertical is about zero (0) degrees, then no rotation of the container portion 120 may be needed. The connector 260 is then inserted through the attachment recess 190 and the appropriate positioning recess 250 or otherwise attached. The container caddy 100 is then fixedly attached in that position to the shopping cart 300. It is understood that the container caddy 100 may be attached to structures other than the back support element 370 of the shopping cart 300 or to other types of structures in addition to shopping carts.

A consumer can place a beverage container, such as a bottle 400, within the container recess 140 without spillage. Alternatively, a can or a cup also may be used. Because the container caddy 100 is horizontal with respect to the shopping cart 300, the bottle 400 will remain vertical and supported. More than one container caddy 100 may be used on a single shopping cart 300.

Because the container caddy 100 is positioned on the child seat 350 in plain view of the consumer, the advertising indicia 160 is always in view of the consumer. The container caddy 100 therefore provides both convenience and messaging to the consumer.

Figure 12:
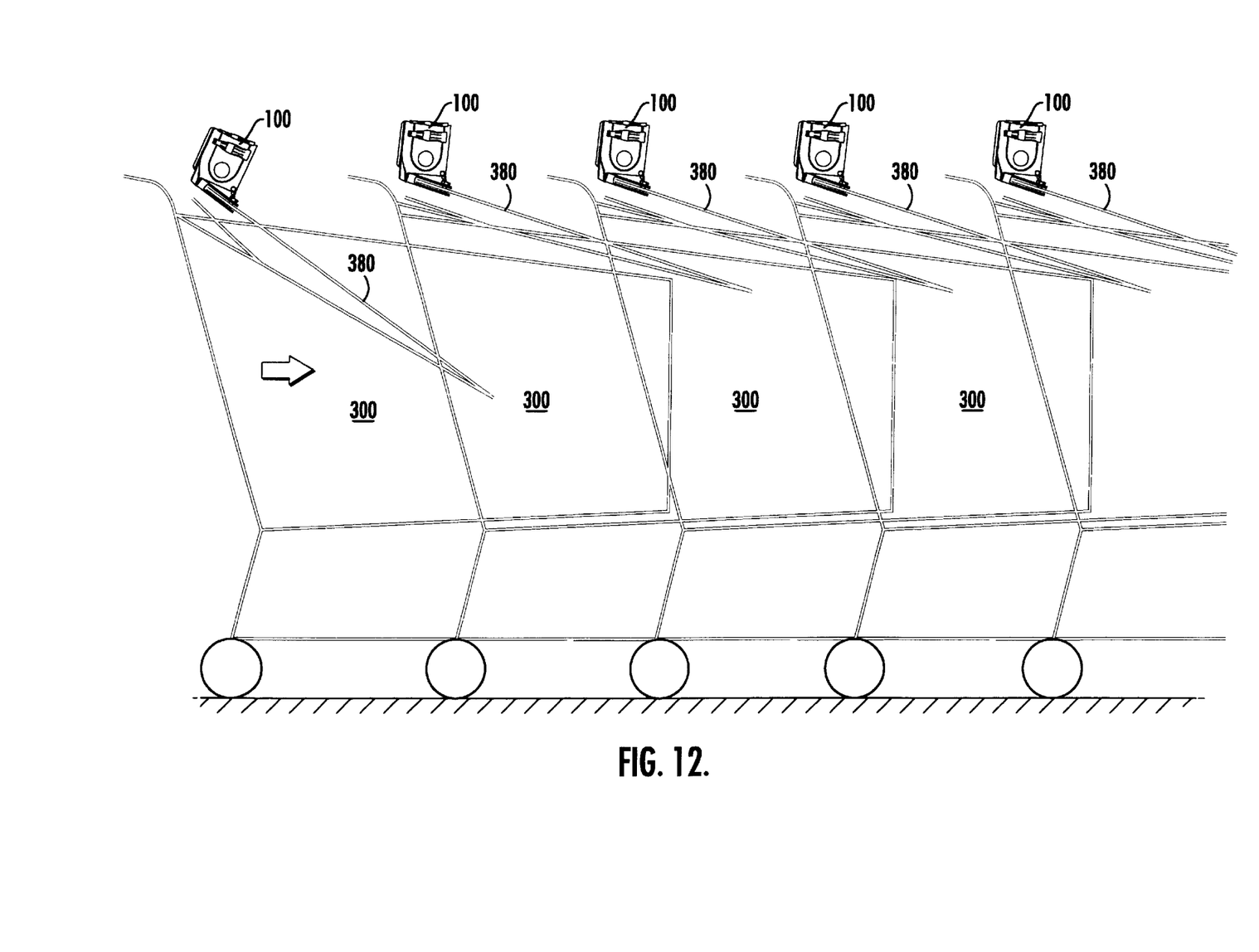
FIG. 12 is a side plan view of a plurality of shopping carts nested together with each shopping cart having the container caddy thereon.

FIG. 12 shows a plurality of the shopping carts 300 nested together in a conventional fashion. Each of the shopping carts 300 has the container caddy 100 positioned thereon. Because the container caddy 100 is on the rotatable seat support 380 and because the container caddy 100 has a length less than the minimum nesting distance for most shopping carts 300, the container caddy 100 fits between the nested carts 300 without causing any obstruction. The shopping carts 300 can nest together fully without the container caddys 100 interlocking or otherwise interfering with each other or with the shopping carts.

It should be apparent that the foregoing relates only to the preferred embodiments of the present invention and that numerous changes and modifications may be made herein without departing from the spirit and scope of the invention as defined by the following claims.

We claim:

1. A container caddy for use with a shopping cart, comprising:
    a container receptacle;
    said container receptacle comprising an attachment recess positioned therein; and
    an attachment bracket connected to said container receptacle;
    said attachment bracket comprising a plurality of attachment arms and a locking element;
    said plurality of attachment arms each comprising a support wing with a plurality of positioning recesses therein, such that said attachment bracket can be positioned on said shopping cart and said container receptacle can maneuver until said attachment recess of said container receptacle aligns with one of said plurality of positioning recesses of said support wings and may be locked into place by said locking element.

2. The container caddy of claim 1, further comprising a thermoplastic material.

3. The container caddy of claim 1, wherein said attachment bracket comprises a hinge.

4. The container caddy of claim 3, wherein said hinge comprises a living hinge.

5. The container caddy of claim 3, wherein said container receptacle comprises a base and a recess positioned within said base.

6. The container caddy of claim 5, wherein said base comprises a substantially circular-shaped portion.

7. The container caddy of claim 5, wherein said base comprises a unitary element.

8. The container caddy of claim 5, wherein said base comprises a first surface, a second surface, and a plurality of support elements connecting said first surface and said second surface.

9. The container caddy of claim 5, wherein said base comprises advertising indicia thereon.

10. The container caddy of claim 5, wherein said base comprises one or more drain openings in communication with said recess.

11. The container caddy of claim 5, further comprising a depth dimension extending within said recess and a length dimension extending perpendicular to said recess.

12. The container caddy of claim 11, wherein said depth dimension comprises about two and a half (2.5) inches to about eight (8) inches.

13. The container caddy of claim 11, wherein said length dimension comprises about four (4) inches to less than about eleven (11) inches.

14. The container caddy of claim 1, wherein said plurality of attachment arms comprises a distance therebetween so as to accommodate attachment to said shopping cart.

15. The container caddy of claim 1, wherein said plurality of attachment arms comprises attachment holes therein such that said plurality of attachment arms may be fixedly attached to said shopping cart.

16. The container caddy of claim 1, wherein said attachment bracket comprises advertising indicia thereon.

17. The container caddy of claim 3, wherein said hinge comprises a range of motion of about zero (0) degrees to about twenty-five (25) degrees.

18. A shopping cart, comprising:

a child seat;

said child seat comprising a back support element connected to an inclined seat support element; and a container caddy positioned on said back support element;

said container caddy comprising a container receptacle and an attachment bracket connected to said container receptacle;

said attachment bracket comprising a plurality of attachment arms and a locking element;

said plurality of attachment arms each comprising a support wing with a plurality of positioning recesses therein, such that said attachment bracket can be positioned on said back support element and said container receptacle can maneuver until said attachment recess of said container receptacle aligns with one of said plurality of positioning recesses of said support wings such that said container receptacle is substantially horizontal and said container receptacle is locked into place by said locking element.

19. The shopping cart of claim 18, wherein said inclined seat support element comprises an angle from the vertical of about zero (0) degrees to about twenty-five (25) degrees.

20. The shopping cart of claim 19, wherein said attachment bracket comprises a living hinge.

21. The shopping cart of claim 20, wherein said living hinge comprises a range of motion of about zero (0) degrees to about twenty-five (25) degrees.

22. The shopping cart of claim 18, further comprising a plurality of said shopping carts nesting together fully, with each said shopping cart having said container caddy positioned thereon.

23. The shopping cart of claim 22, wherein said plurality of shopping carts can nest together without said plurality of container caddys positioned thereon interlocking.

24. The shopping cart of claim 18, further comprising a plurality of container caddys positioned thereon.

25. The shopping cart of claim 18, further comprising a beverage container positioned within said container caddy.

26. A container caddy for use with a shopping cart, comprising:

a container receptacle;

said container receptacle comprising a base with a plurality of attachment recesses positioned therein; and an attachment bracket connected to said container receptacle;

said attachment bracket comprising a hinge with a plurality of attachment arms connected thereto;

said plurality of attachment arms comprising a support wing extending therefrom; and said attachment bracket further comprising a locking element, such that said attachment bracket can be positioned on said shopping cart and said container receptacle can maneuver by said hinge until locked into place by said locking element.

27. The container caddy of claim 26, wherein each said support wing comprises a plurality of positioning recesses therein.

28. The container caddy of claim 27, wherein said plurality of positioning recesses of said plurality of attachment arms aligns with said plurality of attachment recesses of said base and connected by a connector so as to lock said container receptacle into place.

* * * * *